United States Patent
Nam et al.

(10) Patent No.: US 9,537,637 B2
(45) Date of Patent: Jan. 3, 2017

(54) METHOD FOR TRANSMITTING DOWNLINK SIGNAL AT A RELAY NODE IN A WIRELESS COMMUNICATION SYSTEM AND APPARATUS THEREFOR

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Sungsik Nam, Seoul (KR); Dongin Kim, Suwon (KR); Wan Choi, Seoul (KR); Hanbyul Seo, Anyang-si (KR)

(73) Assignees: LG ELECTRONICS INC., Seoul (KR); RESESARCH & BUSINESS FOUNDATION SUNGKYUNKWAN UNIVERSITY, Gyeonggi-do (KR)

( * ) Notice: Subject to any disclaimer, the term of this patent is extended or adjusted under 35 U.S.C. 154(b) by 37 days.

(21) Appl. No.: 14/395,659

(22) PCT Filed: Nov. 8, 2012

(86) PCT No.: PCT/KR2012/009398
§ 371 (c)(1),
(2) Date: Oct. 20, 2014

(87) PCT Pub. No.: WO2014/014165
PCT Pub. Date: Jan. 23, 2014

(65) Prior Publication Data
US 2015/0117300 A1    Apr. 30, 2015

Related U.S. Application Data

(60) Provisional application No. 61/671,785, filed on Jul. 15, 2012.

(51) Int. Cl.
*H04L 5/00* (2006.01)
*H04L 1/18* (2006.01)
(Continued)

(52) U.S. Cl.
CPC ............... *H04L 5/0055* (2013.01); *H04B 7/15* (2013.01); *H04L 1/1819* (2013.01);
(Continued)

(58) Field of Classification Search
CPC ..... H04B 7/15; H04B 7/15528; H04L 1/0026; H04L 1/1819; H04L 1/1887; H04L 2001/0097; H04L 5/0055
(Continued)

(56) References Cited

U.S. PATENT DOCUMENTS 8,693,413 B2 * 4/2014 Kanazawa ............ H04L 1/0026
370/329
2008/0049658 A1 * 2/2008 Asai ....................... H04B 7/022
370/315
(Continued)

FOREIGN PATENT DOCUMENTS

EP          1 702 444 B1    10/2007
EP          2 461 636 A1    6/2012
WO    WO 2010/083901 A1    7/2010

*Primary Examiner* — Chi H Pham
*Assistant Examiner* — Robert Lopata
(74) *Attorney, Agent, or Firm* — Birch, Stewart, Kolasch & Birch, LLP

(57) ABSTRACT

A method for transmitting downlink signals at a source base station in a wireless communication system is disclosed. The method comprises transmitting a downlink signal to an end user and at least one relay; receiving a negative response signal from the end user; receiving a positive response signal and channel status information about a channel between the at least one relay and the end user, wherein the at least one relay overhears the negative response signal; and scheduling
(Continued)

a specific relay having the best channel status of the at least one relay to re-transmitting the downlink signal to the end user.

11 Claims, 7 Drawing Sheets

(51) Int. Cl.
    *H04B 7/15*       (2006.01)
    *H04B 7/155*     (2006.01)
    *H04L 1/00*      (2006.01)

(52) U.S. Cl.
    CPC ........ *H04L 1/1887* (2013.01); *H04B 7/15528* (2013.01); *H04L 1/0026* (2013.01); *H04L 2001/0097* (2013.01)

(58) Field of Classification Search
    USPC .......................................................... 370/315
    See application file for complete search history.

(56) References Cited

U.S. PATENT DOCUMENTS

| | | | |
|---|---|---|---|
| 2008/0049718 A1* | 2/2008 | Chindapol | H04B 7/15592 370/351 |
| 2008/0056174 A1* | 3/2008 | Jung | H04B 7/15542 370/315 |
| 2009/0073916 A1* | 3/2009 | Zhang | H04B 7/15542 370/315 |
| 2009/0227201 A1* | 9/2009 | Imai | H04B 7/15557 455/7 |
| 2010/0172284 A1* | 7/2010 | Horiuchi | H04B 7/15542 370/315 |
| 2010/0297936 A1* | 11/2010 | Nan | H04L 1/1812 455/7 |
| 2010/0315957 A1* | 12/2010 | Koo | H04B 7/15592 370/246 |
| 2010/0322136 A1* | 12/2010 | Kanazawa | H04L 1/0026 370/312 |
| 2010/0322143 A1* | 12/2010 | Cai | H04L 1/16 370/315 |
| 2011/0014911 A1 | 1/2011 | Baldemair et al. | |
| 2011/0064059 A1* | 3/2011 | Hooli | H04W 36/24 370/332 |
| 2011/0080865 A1* | 4/2011 | Tsai | H04B 7/1555 370/315 |
| 2011/0124284 A1* | 5/2011 | Adam | H04B 7/15592 455/7 |
| 2011/0273999 A1* | 11/2011 | Nagaraja | H04B 7/15557 370/252 |
| 2011/0280174 A1* | 11/2011 | Li | H04B 7/15528 370/315 |
| 2012/0108164 A1* | 5/2012 | Yuda | H04B 7/15521 455/9 |
| 2012/0127888 A1* | 5/2012 | Fujishima | H04W 72/085 370/252 |
| 2012/0134317 A1* | 5/2012 | Weitkemper | H04L 1/0026 370/315 |
| 2012/0243430 A1* | 9/2012 | Song | H04L 1/0015 370/252 |
| 2013/0135988 A1* | 5/2013 | Kim | H04L 1/1819 370/216 |
| 2014/0022982 A1* | 1/2014 | Kim | H04L 1/0077 370/315 |
| 2015/0029926 A1* | 1/2015 | Ryu | H04L 1/1861 370/312 |

\* cited by examiner

——▶ link based on downlink carrier band
——▶ link based on uplink carrier band

Estimate AM level

METHOD FOR TRANSMITTING DOWNLINK SIGNAL AT A RELAY NODE IN A WIRELESS COMMUNICATION SYSTEM AND APPARATUS THEREFOR

CROSS REFERENCE TO RELATED APPLICATIONS

This application is the National Phase of PCT International Application No. PCT/KR2012/009398, filed on Nov. 8, 2012, which claims priority under 35 U.S.C. 119(e) to U.S. Provisional Application No. 61/671,785, filed on Jul. 15, 2012, all of which are hereby expressly incorporated by reference into the present application.

TECHNICAL FIELD

The present invention relates to a wireless communication system, and more particularly, to a method for transmitting downlink signal at a relay node with a base station in a wireless communication system and an apparatus therefor.

BACKGROUND ART

FIG. 1 illustrates a relay node (RN) 120 and user equipments (UE) 131 and 132, which exist within one base station (eNodeB; eNB) 110 in a wireless communication system 100. The relay node 120 may forward data received from the base station 110 to the user equipment 132 therein and forward the data received from the user equipment 132 therein to the base station 110. Also, the relay node 120 may extend a high data rate region, enhance communication quality at a cell edge, and support communication inside a building or a zone beyond base station service coverage. In FIG. 1, a user equipment (hereinafter, referred to as macro-user equipment (Macro-UE or M-UE)) such as the user equipment 131, which directly receives a service from the base station, and a user equipment (hereinafter, referred to as relay-user equipment (Relay-UE or R-UE)) such as the user equipment 132, which receives a service from the relay node 120, are shown.

A wireless link between the base station 110 and the relay node 120 will be referred to as a backhaul link, a link from the base station 110 to the relay node 120 will be referred to as a backhaul downlink, and a link from the relay node 120 to the base station 110 will be referred to as a backhaul uplink. Also, a wireless link between the relay node 120 and the user equipment 132 will be referred to as an access link. A link from the relay node 120 to the user equipment 132 will be referred to as an access downlink, and a link from the user equipment 132 to the relay node 120 will be referred to as an access uplink.

Furthermore, in the case that the relay node 120 is operated in such a way to control a cell by itself, the user equipment 132 may recognize the relay node 120 as a normal base station.

DISCLOSURE OF INVENTION

Technical Problem

An object of the present invention devised to solve the problem lies on a method for transmitting downlink signal at a relay node with a base station in a wireless communication system and an apparatus therefor.

More specifically, the present invention is to increase the achievable data rate by iteratively scheduling a relatively better UE relay closer by end user in probabilistic sense, provided the UE relay-to-end user (access) link should be operated in open-loop and transparent mode. The latter is due to the fact that there is no dedicated control channel between UE relay and end user, and a new cell is not created.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for transmitting downlink signals at a source base station in a wireless communication system comprises transmitting a downlink signal to an end user and at least one relay; receiving a negative response signal from the end user; receiving a positive response signal and channel status information about a channel between the at least one relay and the end user, wherein the at least one relay overhears the negative response signal; and scheduling a specific relay having the best channel status of the at least one relay to re-transmitting the downlink signal to the end user. Here, the at least one relay is an user equipment (UE) relay.

The at least one relay estimates the channel status information between the at least one relay and the end user, based on the overheard the negative response signal Here, the at least one relay transmits the positive response signal and the channel status information if the at least one relay decodes the downlink signal correctly.

More preferably, the step of scheduling the specific relay performs iteratively until receiving the positive response signal from the end user. Further, the step of scheduling the specific relay performs iteratively on subframe basis.

Also, if the end user decodes the re-transmitted downlink signal correctly, the end user transmits the positive response signal to the source base station or both the source base station and the specific relay.

As a other aspect of the present invention, a method for transmitting downlink signals at a relay in a wireless communication system comprises receiving a downlink signal from a source base station; overhearing a negative response signal which is transmitted from an end user to the source base station; transmitting a positive response signal and channel status information about a channel between the relay and the end user if decoding the downlink signal correctly; and receiving scheduling information from the source base station; re-transmitting the downlink signal to the end user based on the scheduling information. Here, the relay is an user equipment (UE) relay.

Preferably, the relay has the best channel status among at least one relay including the relay.

Advantageous Effects of Invention

According to the present invention, the relay node can transmit downlink signals more efficiently with the base station in the wireless communication system.

More specifically, under this open-loop and transparent mode, the present invention does not require additional channel allocation/usage over the access link of UE relay-to-end user near cell boundary or in indoor wireless environment with weaker signal quality from the serving base station (eNB). Further, the iterative scheduling adopts a single subchannel allocation and usage over the access link for transparency and enables UE-to-UE direct communication with proximity for higher spectral and energy efficiency, respectively. Finally, it can further improve energy and spectral efficiency by adopting clearing buffer of non-scheduled UE relays for receiving the next frame.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
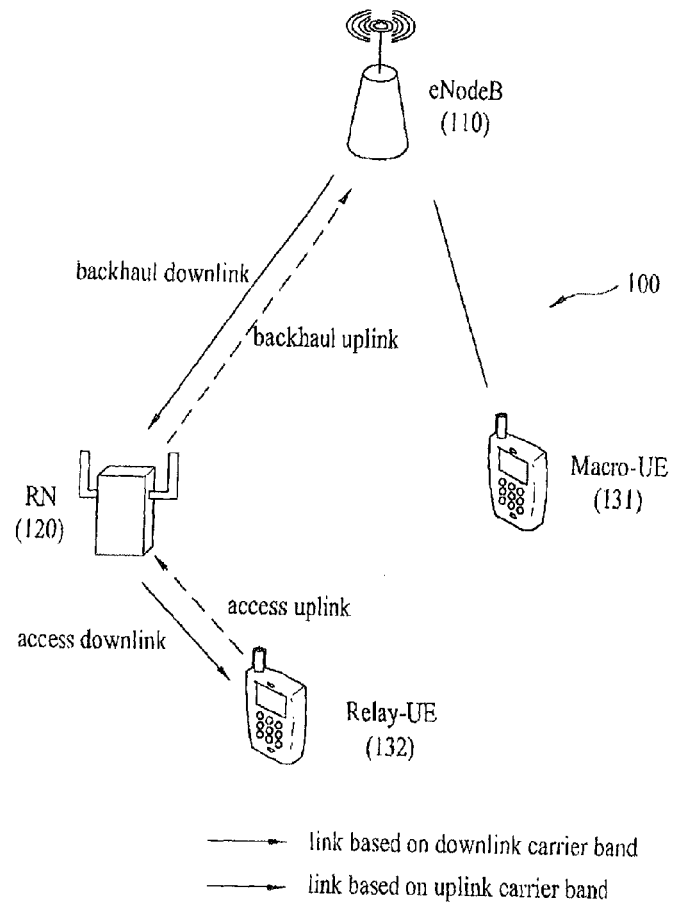
FIG. 1 is a diagram illustrating a wireless communication system that includes a base station, a relay node and user equipments.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the base station (BS) may be replaced with terms such as a fixed station, Node B, eNode B (eNB), and an access point (AP). Also, in this specification, the term, base station may be used as a concept that includes a cell or sector. Meanwhile, a relay may be replaced with a relay node (RN) or a relay station (RS). The terminal may be replaced with terms such as a user equipment (UE), a mobile station (MS), a mobile subscriber station (MSS), an advanced mobile station (AMS), or a subscriber station (SS).

Also, specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus.

Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as code division multiple access (CDMA), frequency division multiple access (FDMA), time division multiplex access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM) general packet radio service (GPRS) enhanced data rates for GSM evolution (EDGE). The OFDMA may be implemented by radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA on a downlink and SC-FDMA on an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE system and the 3GPP LTE-A system.

Before describing the present invention, related technologies will be briefly described.

Relay Node

The relay node may be considered to expand high data rate coverage, improve group mobility, arrange a temporary network, improve cell edge performance and/or provide network coverage to a new zone.

Referring to FIG. 1 again, the relay node 120 serves to forward transmission and reception between the base station 110 and the user equipment 132. Two types of links (backhaul link and access link) having different attributes are applied to each carrier frequency band. The base station 110 may include a donor cell. The relay node 120 may be connected with a radio-access network in a radio mode through a donor cell 110.

If a backhaul link between the base station 110 and the relay node 120 uses a downlink frequency band or downlink subframe resource, it may be referred to as a backhaul downlink. If the backhaul link between the base station 110 and the relay node 120 uses an uplink frequency band or uplink subframe resource, it may be referred to as a backhaul uplink. In this case, the frequency band is a resource allocated in a frequency division duplex (FDD) mode, and the subframe is a resource allocated in a time division duplex (TDD) mode. Similarly, if an access link between the relay node 120 and the user equipment 132 uses a downlink frequency band or downlink subframe resource, it may be referred to as an access downlink. Also, if the access link between the relay node 120 and the user equipment 132 uses an uplink frequency band or uplink subframe resource, it may be referred to as an access uplink. FIG. 1 illustrates configuration of the backhaul uplink/downlink and access uplink/downlink in an FDD mode relay node.

The base station is required to receive the uplink and transmit the downlink, while the user equipment is required to transmit the uplink and receive the downlink. Meanwhile, the relay node is required to transmit the backhaul uplink to the base station, receive the access uplink from the user equipment, receive the backhaul downlink from the base station, and transmit the access downlink to the user equipment.

In the mean time, in respect of band (or spectrum) use of the relay node, the case where the backhaul link is operated at the same frequency band as that of the access link will be referred to as 'in-band', and the case where the backhaul link and the access link operated at different frequency bands will be referred to as 'out-band'. In case of both in-band and out-band, the user equipment (hereinafter, referred to as legacy user equipment) operated in accordance with the existing LTE system (for example, release-8) should access a donor cell.

The relay node may be divided into a transparent relay node or a non-transparent relay node depending on whether the user equipment recognizes the relay node. The transparent relay node means that the user equipment fails to recognize communication with the network through the relay node. The non-transparent relay node means that the user equipment recognizes communication with the network through the relay node.

In respect of control of the relay node, a relay node configured as a part of the donor cell or a relay node controlling a cell by itself may be provided.

Although the relay node configured as a part of the donor cell has a relay node identifier (ID), it does not have its cell identity. If at least a part of radio resource management (RRM) is controlled by the base station to which the donor cell belongs (even though the other portions of the RRM are located in the relay node), it may be referred to as the relay node configured as a part of the donor cell. Preferably, the relay node may support the legacy user equipment. For example, examples of this relay node may include various types of L2 (second layer) relay nodes, decode-and-forward relays and smart repeaters, and type-2 relay node.

In case of the relay node controlling a cell by itself, the relay node controls one or more cells, unique physical layer cell identity is provided to each of the cells controlled by the relay node, and the same RRM mechanism may be used. In view of the user equipment, there is no difference between access to the cell controlled by the relay node and access to the cell controlled by the base station. Preferably, the cell controlled by the relay node may support the legacy user equipment. For example, example of this relay node include a self-backhauling relay node, an L3 (third layer) relay node, a type-1 relay node and a type-1a relay node.

The type-1 relay node is an in-band relay node and controls a plurality of cells, each of which is regarded as a separate cell different from the donor cell in view of the user equipment. Also, each of the plurality of cells may have its physical cell ID (defined in LTE release-8), and the relay node may transmit its synchronization channel, reference signal, etc. In case of single-cell operation, the user equipment may directly receive scheduling information and HARQ feedback from the relay node and transmit its control channel (scheduling request (SR), CQI, ACK/NACK, etc.) to the relay node. Also, the type-1 relay node is regarded as the legacy base station (base station operated in accordance with the LTE release-8 system) by the legacy user equipments (user equipments operated in accordance with the LTE release-8 system). In other words, the type-1 relay node backward compatibility. Meanwhile, the type-1 relay node is regarded as another base station different from the legacy base station by the user equipments operated in accordance with the LTE-A system, whereby performance may be improved.

The type-1a relay node has the same features as those of the aforementioned type-1 relay node except that it is operated in accordance with out-band. The operation of the type-1a relay node may be configured so as to be affected by the operation of L1 (first layer) within the minimum range, or may be configured so as not to be affected by the operation of L1 (first layer).

The type-2 relay node is an in-band relay node, and does not have separate physical cell ID, whereby a new cell is not formed. The type-2 relay node is transparent with respect to the legacy user equipment, and the legacy user equipment fails to recognize the presence of the type-2 relay node. Although the type-2 relay node may transmit the PDSCH, it does not transmit at least CRS and PDCCH.

Hybrid Automatic Retransmission reQuest (HARQ) Operation

As a control method for reception failure of data, the following HARQ operation may be used. If a data transmitting side receives ACK signal from a data receiving side after transmitting one packet, it may transmit a new packet. If the data transmitting side receives NACK signal from the data receiving side, it may retransmit a previously transmitted packet. At this time, a packet to which encoding based on a forward error correction (FEC) function is applied may be retransmitted. Accordingly, as a result of receiving and decoding one packet, the data receiving side transmits ACK signal if decoding is successfully performed, and transmits NACK signal if decoding is failed and stores the received packet in a buffer. If the retransmitted packet based on the NACK signal is received, the data receiving side performs decoding for the received packet together with the packet stored in the buffer, whereby a receiving success rate of the packet may be enhanced.

The HARQ scheme may be divided into a synchronous HARQ scheme and an asynchronous HARQ scheme in accordance with retransmission timing. In case of the synchronous HARQ scheme, if initial transmission has been failed, retransmission is performed at the time defined by the system. For example, if retransmission is defined to be performed at every fourth time unit (for example, subframe) after initial transmission is failed, it is not required to additionally notify the receiving side of information on the retransmission timing. Accordingly, if the data transmitting side receives the NACK signal, it retransmits the packet at every fourth time unit until it receives the ACK signal. Meanwhile, according to the asynchronous HARQ scheme, information on the retransmission time is separately scheduled. Accordingly, the retransmission timing of the packet corresponding to the NACK signal may be changed by several conditions such as a channel status.

Also, the HARQ scheme may be divided into an adaptive HARQ scheme and a non-adaptive HARQ scheme depending on whether a channel status is reflected in the quantity of a resource used for retransmission. In the non-adaptive HARQ scheme, MCS level of the retransmitted packet, the number of used resource blocks, etc. are defined during initial transmission. For example, if the transmitting side transmits data by using eight resource blocks during initial transmission, it retransmits the data by equally using eight resource blocks during retransmission. Meanwhile, in the adaptive HARQ scheme, a modulation mode of packet, the number of used resource blocks, etc. are varied depending on a channel status. For example, even if transmission is initially performed using eight resource blocks, retransmission may be performed using resource blocks greater or smaller than eight resource blocks depending on the channel status.

In data packet transmission operation through the aforementioned HARQ, the transmitting side may perform initial transmission and retransmission in a sub-packet unit by converting a data packet into sub-packets of a predetermined size. The receiving side may try decoding of the data packet by combining several sub-packets.

Several sub-packets used for initial transmission and retransmission according to the HARQ scheme are generated from one codeword packet. At this time, the generated sub-packets may be identified by their length and start position. The sub-packets that may be identified will be referred to as redundancy versions (RV). The receiving side may try decoding of all the codewords by receiving and combining different RVs. For example, the HARQ operation may be performed in such a manner that the receiving side receives RVs corresponding to the difference between all the codeword packets to be received and previously received sub-packets and tries decoding for the received RVs. This HARQ operation may be referred to as incremental redundancy (IR) based HARQ operation.

HARQ Operation Through UE-Relay

The UE-relay is not a fixed relay node but a relay node where one user equipment assists another user equipment. Cooperative communication through the UE-relay may be referred to as cooperative communication between user equipments. The UE-relay may correspond to the aforementioned type-2 relay node.

If the UE-relay is used, a destination mode (or destination user equipment) fails to recognize the presence of the UE-relay. Accordingly, information change between the relay node and the destination mode is not performed previously, and the channel status is not feed back from the destination node to the relay node. In other words, the relay node transmits data to the destination node without information on the channel between the relay node and the destination node. Data transmission from the relay node to the destination node should be performed in an open-loop mode.

If the partial signal forwarding scheme through the UE-relay is used, channels h1 and h2 from a source node (that is, base station) to each of the user equipments may be determined by channel status information feedback reported from each user equipment. However, the channel h12 between the UE-relay U1 and the destination node U2 may be determined by an average feature of a channel instead of an actual channel environment.

In this way, if partial signal forwarding through the UE-relay is performed in an open-loop mode, it is likely that communication outage occurs. In order to correct such an error, HARQ based retransmission operation may be used.

Hereinafter, according to the embodiments of the present invention, a partial signal forwarding scheme may be used as a partial signal forwarding scheme through a relay node.

The partial signal forwarding scheme means direct data transmission considering a channel status from the source node to the destination node and additional data transmission from the relay node to the destination node. The data which will be transmitted from the relay node to the destination node may be provided by the source node. In this case, the source node may directly transmit the data to the relay node, or the relay node may overhear the data transmitted from the source node to the destination node.

Relaying Protocols

There are two distinguished relaying protocols, such as amplify-&-forward (AF) and decode-&-forward (DF). These relaying protocols have main drawbacks, in that the AF protocol forwards an amplified unwanted signal, leading to the noise amplification while the DF protocol can introduce decoding errors, leading to the error propagation. To overcome these main drawbacks, the dynamic DF (DDF) protocol was proposed. It is required of the relay to inform the forwarding related information (e.g., the forwarding time and the error correcting codes) to destination since such information is a priori unknown at the relay due to the random nature of the source-to-relay (S-R) link quality due to fading.

In the next-generation cellular standards (e.g., LTE-Advanced), two types of relaying strategies (type-1 relay and type-2 relay) are defined to deploy relays to increase the cell coverage and data rate without creating undue inter-cell interference, which is a prerequisite for implementing the energy-efficient (or green) user equipment (UE). The former is to create an independent cell with small cell coverage, resulting in extended coverage, whereas the latter is to increase the data rate by utilizing the UE (type-2) relay for forwarding overheard message without cell creation. Especially, this paper will consider UE relay for increasing the data rate of end user near cell boundary or in indoor wireless environment (with weaker signal quality from eNodeB (eNB)). In UE relay, the relay-to-destination (R-D) link must be operated in open-loop and transparent mode. Consequently, D will not be able to distinguish between those transmitted signals from S and R.

One of the main advantages by using the DDF protocol is that fast jump-in relaying and decoding are possible at R and D, respectively. However, the relaying with conventional DDF protocol may not be suitable for use in UE relay. This is because the following crucial issues should be addressed for practical implementation of UE relay. First, the term "user equipment" is referred to as a mobile functioning (i.e., not fixed relay). This mobile functioning causes variations in both large-scale and small-scale channel conditions. Second, UE relay is battery powered (i.e., power limited) so that transmissions from R to R, and R to D are typically in low power and short range. Third, R-D link is operated in open-loop mode where each UE relay link appears transparent to end user. Moreover, the R-D link channel state information (CSI) is not fully (at most partially) available at UE relay.

To overcome the above limitations, we propose "Iterative Hybrid ARQ (I-HARQ) for Multiple User Equipment (UE) Relays" to increase the achievable data rate without causing loss in spectral efficiency via a single subchannel allocation and usage (allocating and using only the same single channel as used by Source (eNB).) and also to improve the energy efficiency via UE-to-UE direct communication with proximity.

For practical implementation of the proposed I-HARQ protocol, an overhearing mechanism with partial CSI feedback from UE relays is employed to properly estimate the R-D link status and schedule a relatively better UE relay successively in each subframe. Especially, the latter enables UE-to-UE direct communication with proximity, resulting in energy saving mode. Further, adaptive modulation (AM) can be integrated with the I-HARQ protocol to accelerate the collaboration phase and render the early termination at D for higher achievable data rate.

Considering the limited power and range of UE relay, as well as the limited CSI, it is desired to select a route comprising a sequence of candidate UE relays in probabilistic sense, such that the reliability over open-loop access (R-D) link can be increased for successful retransmission. In general fading conditions, the UE relay closer by S is more likely to succeed in decoding earlier while the UE relay closer by D likely succeeds in decoding later. Meanwhile, the UE relay succeeded in decoding later will likely yield a better R-D link gain than that succeeded in decoding earlier. Based on these observations, we propose "iterative scheduling" of the candidate UE relays closer by D in probabilistic sense, one at a time. Then, end user will likely see a better R-D link gain that leads to successful decoding earlier with increased data rate, especially for UE relays operating in open-loop mode over multiple R-D links with uncertainty.

Rateless code property of reconstructing the source data from any subset of encoded packets is particularly attractive for UE relays overhearing the packets in between source and end user, given that the channel gains over the backhaul and access (S-R and R-D) links are not available. The latter is due to the fact that UE relay is not at fixed location and there is no explicit control channel established over the access (R-D) link. For this reason, recently the application of rateless codes has been advocated to accomplish dynamic decode-&-forward (DDF) with a flexible duration of the listening phase. Therefore, the successful decoding time at UE relay and the forwarding time of its re-encoded message are unknown (or random at the continuous time). To avoid this timing uncertainty, a whole frame is segmented into a number of concatenated subframes and UE relay attempts to decode the overheard message only after receiving each subframe. By adopting subframe decoding, the system can synchronize individual decoding and forwarding time on subframe basis.

Further, to enable transparent and successive decoding at D, the in-phase code mapping realized on a single subchannel, which facilitates the iterative scheduling of candidate UE relays on subframe basis.

System Description

Figure 2:
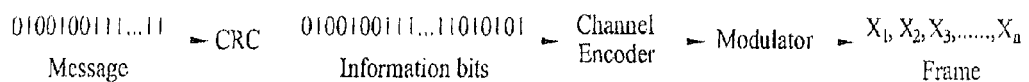
FIG. 2 is a diagram illustrating frame generation by the source.

FIG. 2 is a diagram illustrating frame generation by the source.

Referring to FIG. 2, a message comprises K information bits including cyclic redundancy check (CRC) bits to allow the destination to check the message correct decoding at the destination. These K information bits are then encoded by a rateless code and modulated, which generates a certain number of code symbols {Xn} to form a codeword, that is, a frame.

Figure 3:
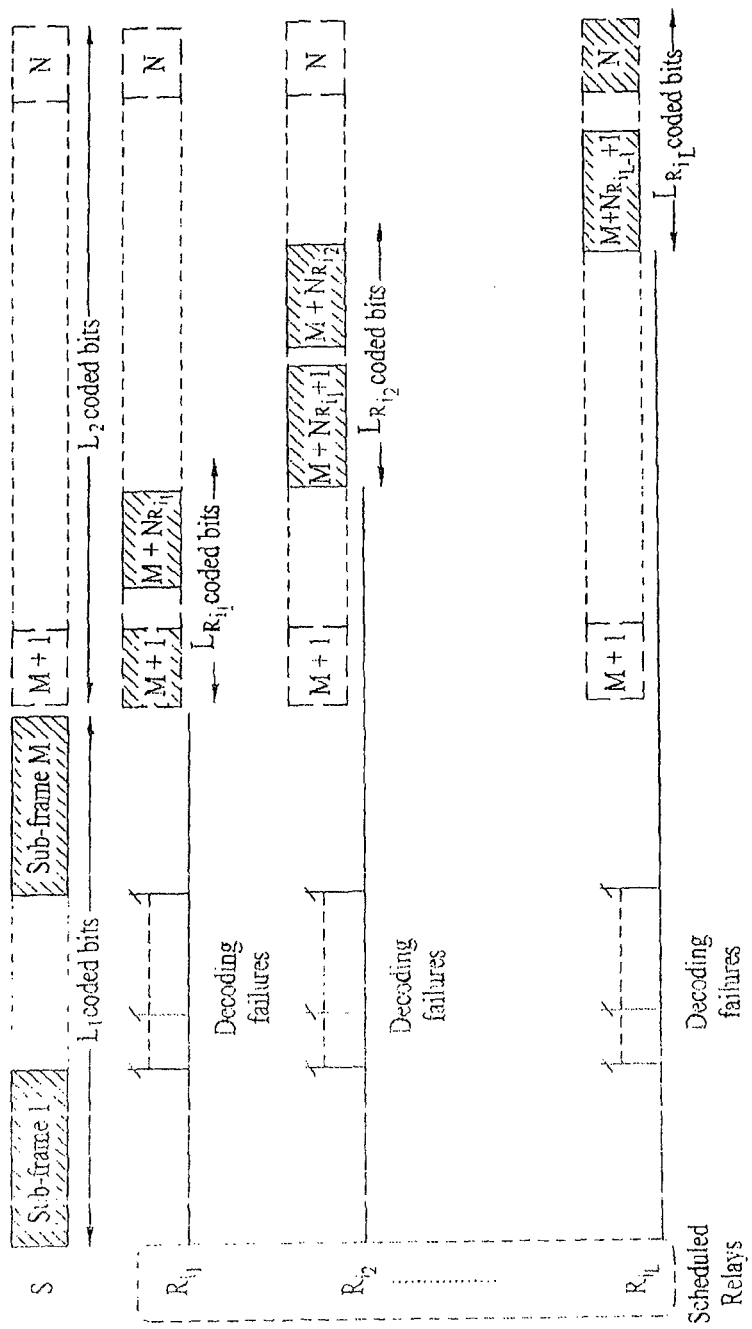
FIG. 3 is a diagram illustrating Frame Structure for subframe decoding.

FIG. 3 is a diagram illustrating Frame Structure for subframe decoding.

Referring to FIG. 3, the frame is segmented into a number of concatenated subframes where the UE relays attempt to decode the overheard message only after receiving each subframe. Note that optimizing a proper size of the subframe is crucial to decoding complexity and efficiency of accumulating the information in decoding, which are conflicting to each other.

We assume there is a feedback path from each UE relay to S. Each UE relay can feedback the estimated partial CSI of R-D link to S. It is also assumed that S can schedule the best relay in each subframe among the relays with successful decoding using this feedback information.

We assume all nodes (S, D, and multiple UE relays) employ a single antenna and all UE relays operate in half-duplex mode where the transmission process is organized in two phases. In the first phase (listening phase), the source broadcasts its message, and the destination and relay nodes receive. If the relay successfully decodes before the destination, the second phase (collaboration phase) starts. During the second phase, the source terminates the transmission mode and the scheduled relay (RSCH) starts re-transmitting the decoded and re-encoded message to both the destination and inactive relays (RINACT). Here, it is assumed that the non-scheduled relays (RNONSCH) clear their buffer for receiving the next frame from source. Note that these non-scheduled relays perform clearing their buffer i) after receiving termination command or ii) if they do not receive any command from S. In addition, it is assumed that the scheduled UE relay reuses a common subchannel used by S in the first phase. Here, synchronized decoding at Rs and end user can be realized via the in-phase code mapping. With the in-phase code mapping, R, upon successful decoding at the j-th subframe, retransmits data to D from (j+1)-th subframe on the same code/subchannel as S uses at each subframe. As a result, end user and Rs can blindly search for any forwarded message after receiving each subframe from S or R.

We employ the random codeset of rateless codes at UE relays whose selection depends on their individual forwarding times on subframe basis. At UE relays, the message decoding is designed to perform sequentially after receiving each subframe. Since the S-R link qualities associated with multiple UE relays are statistically independent and the message decoding is performed after receiving each subframe, we expect that the message correct decoding at UE relays occurs randomly per subframe and the retransmission from relay to end user also occurs randomly per subframe. As a result, the continuous random decoding and forwarding time at UE relays can be controlled in per-subframe basis. As a result, the random decoding and forwarding time at UE relays can be controlled on subframe basis.

Suppose that there are N subframes within a frame, and correct decoding is made at the i-th UE relay after receiving M subframes for M<N. Then, the number of code symbols L1 is transmitted by the source during the first phase, while LRi code symbols by the i-th scheduled UE relay, as illustrated in FIG. 3. Note that the length of L1 and LRi can be varied with the channel status of S-Rs and RSCH-RNONACT links. It is noteworthy that the subframes 1, 2, . . . , N in the figure are not necessarily contiguous in time domain and each transmission from source or scheduled relay to RNONACT and destination can be scheduled in an arbitrary manner. Here, an UE relay for retransmission in each subframe and the controlled termination or retransmission of data transmission at UE relay can be scheduled by the source (eNB).

Overhearing Mechanism with Partial Feedback

The following is the principle of overhearing and feedback mechanism which can be applied with I-HARQ protocol. The basic operation of overhearing mechanism at UE relay is that each UE relay can periodically overhear the reference signal including ACK/NACK signal from D to S, while estimating their R-D link quality. The relative strength of ACK/NACK signal can be measured and quantized at UE relays to identify if their R-D link quality is reliable, resulting in 1-bit limited or partial CSI feedback. The latter facilitates the iterative scheduling of UE relays on subframe basis to enhance the reliability of a route, namely a sequence of open-loop R-D links leading to D. Here, we assume time-division duplexing (TDD). In TDD mode, we can use channel reciprocity to acquire the CSI at the transmitter (the channel reciprocity can be applied for acquiring the CSI at the transmitter).

Figure 4:
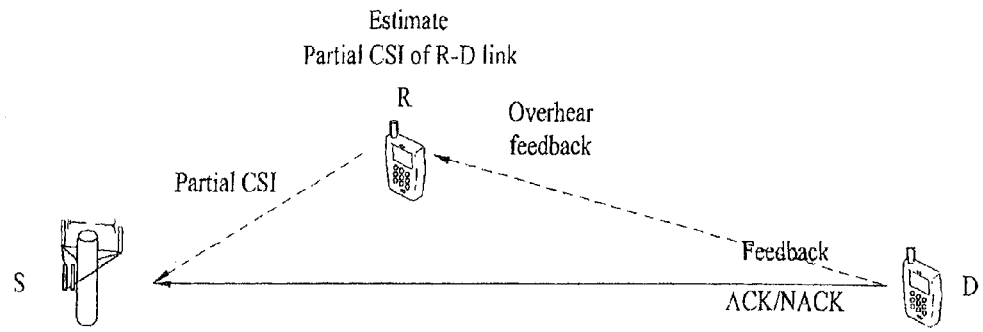
FIG. 4 is a diagram illustrating a basic overhearing mechanism.

FIG. 4 is a diagram illustrating a basic overhearing mechanism.

Referring to FIG. 4, if the ACK/NACK transmission from end user to source can be overheard at UE relay, it is possible to partially feedback the R-D link channel status to the source. Then, a subset of UE relays with relative better R-D link quality can be allowed to forward the decoded message after the message correct decoding. Here, it is assumed that the relative strength of ACK/NACK overheard message can be measured at each UE relay by comparing it with some threshold, so as to identify if the R-D link quality is acceptable. In another way, it is also possible to estimate partial CSI at each UE relay. This overhearing mechanism will certainly improve the spectral efficiency by limiting the subset of such candidates. Further, the forwarding time delay can be inserted at UE relays to distinguish between the candidates with distinct R-D link quality.

Figure 5:
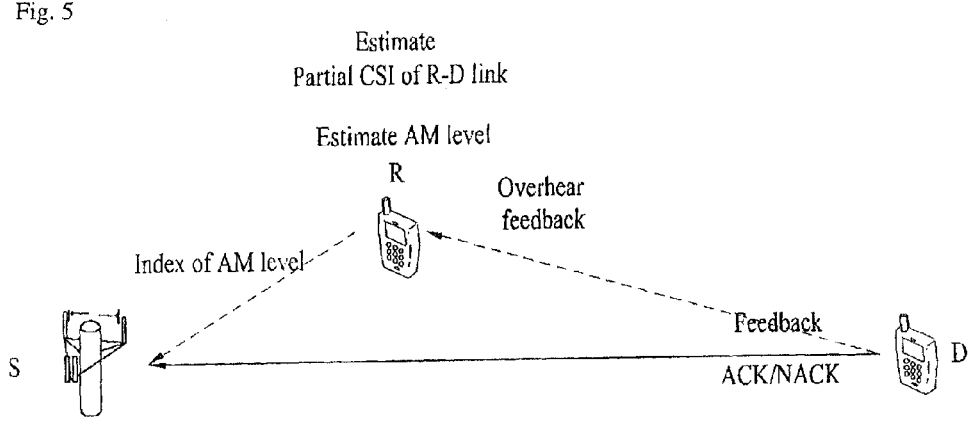
FIGS. 5 and 6 are diagrams illustrating a basic overhearing mechanism with AM.
Figure 6:
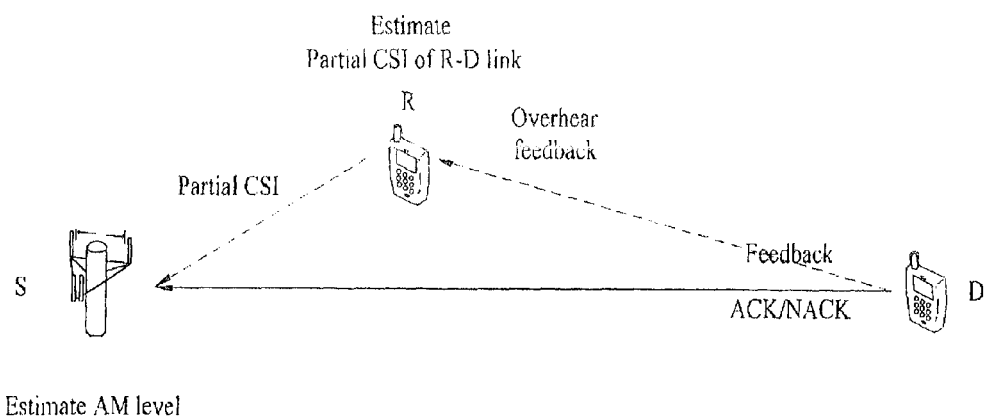

FIGS. 5 and 6 are diagrams illustrating a basic overhearing mechanism with AM. Especially, the overhearing mechanism can be applied with adaptive modulation (AM) scheme. In this case, each UE relay can feedback its modulation level or partial CSI to the source for relay selection per subframe.

Referring to FIG. 5, each UE relay estimates its own modulation level for retransmission to D and then feedbacks this information to S.

Further, referring to FIG. 6, each UE relay feedbacks the estimated partial CSI to D and then S estimates its modulation level.

Relaying Strategies with/without AM

The main idea is that S schedules the best relay with relatively highest R-D link gain in each subframe for retransmission to D among simultaneously active relays. This relay selection procedure is iteratively performed in each subframe until D sends ACK to S. Here, for energy efficiency, the non-scheduled relays among active relays clear their buffers for receiving next frame from S.

Relaying Strategy without AM

S iteratively schedules the best UE relay with relatively highest R-D link gain in each subframe based on the partial CSIs feedback from UE relays.

Figure 7:
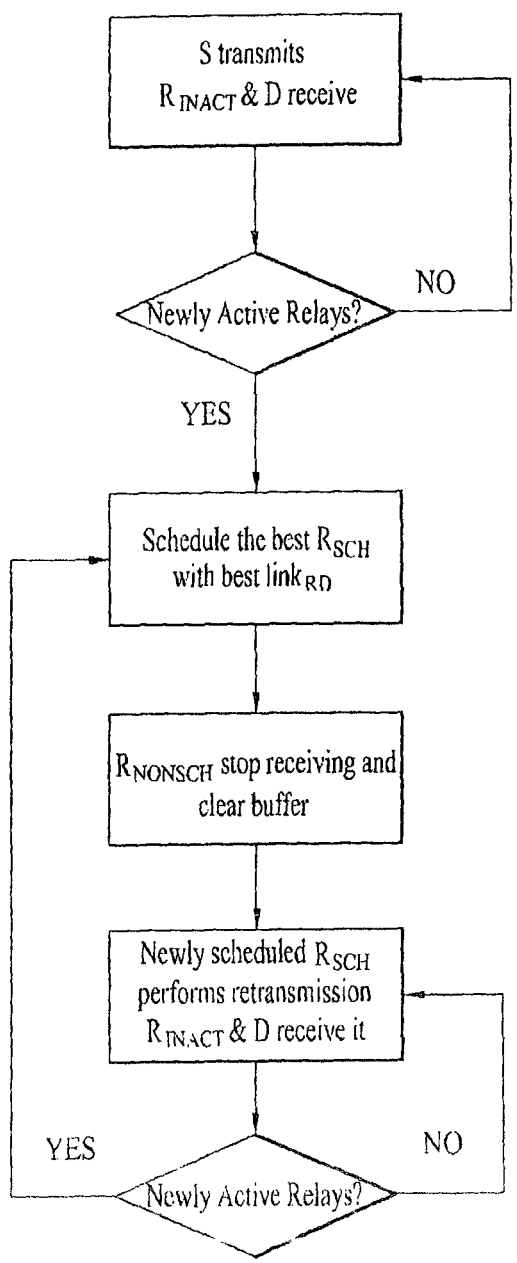
FIGS. 7 and 8 are diagrams illustrating relaying strategies based on the present invention.
Figure 8:
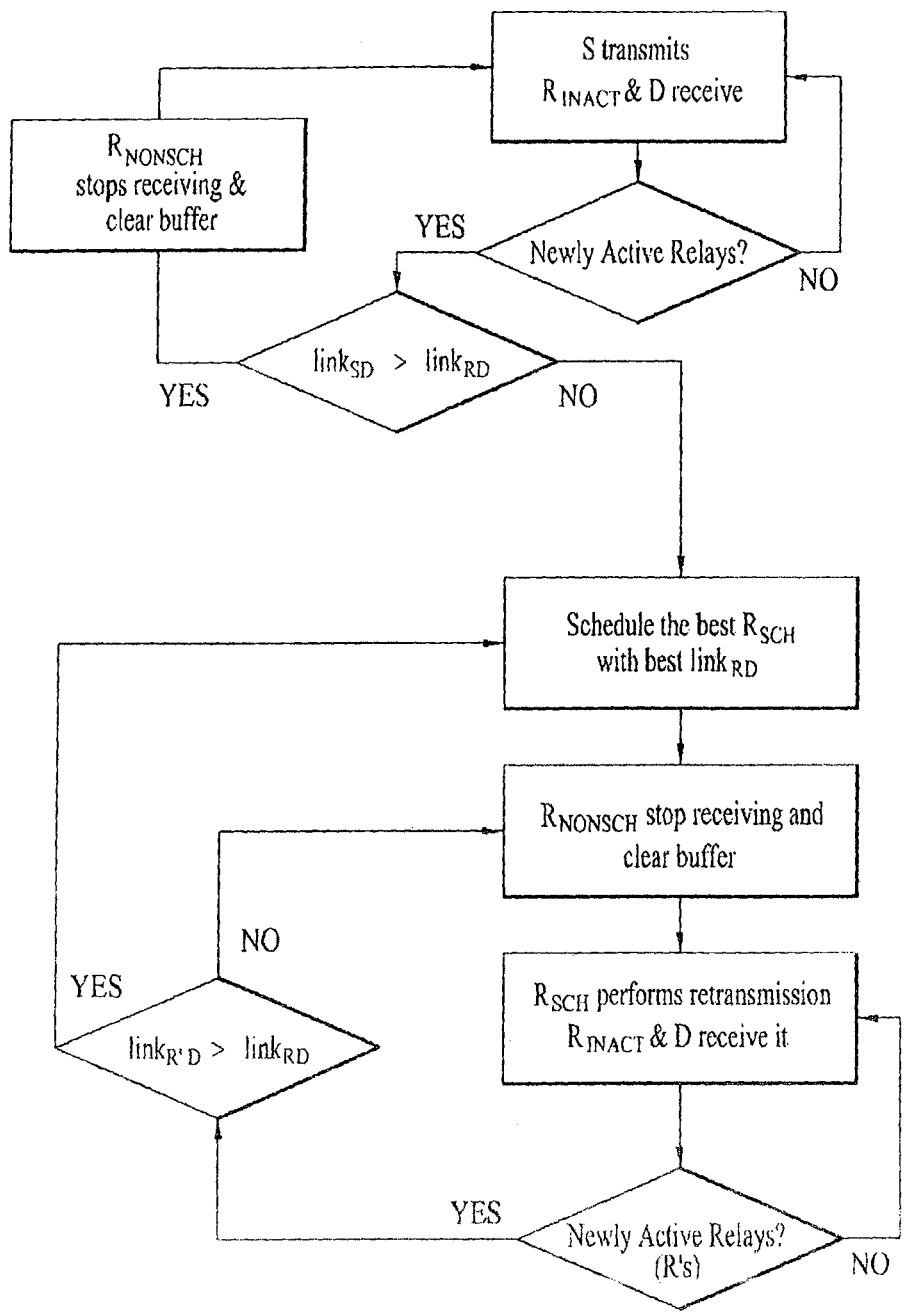

FIGS. 7 and 8 are diagrams illustrating relaying strategies based on the present invention.

More specifically, the UE relays with successful decoding send ACK to S, and S schedules the serving node by comparing among the partial CSIs of; i) only new candidate UE relays as shown in FIG. 7; or ii) new candidate UE relays and the current serving node (S or UE relay) as shown in FIG. 8.

a) For case i): If there is any newly active UE relay in any subframe, then the best relay among newly active relay(s) is scheduled for retransmission to D and then the previous scheduled relay stops retransmission to D.

b) For case ii): If the current serving node has better link gain, then the serving node keeps retransmitting the message to D until any UE relay(s) send(s) ACK to S. If any newly active UE relay has better link gain than the serving node, then the new relay is scheduled for retransmission to D and the previous serving node stop retransmission to D.

Note that the iterative relay scheduling procedure is repeated until D sends ACK to S.

Relaying Strategy with AM:

S schedules the best UE relay with relatively highest modulation level for R-D link. Similar to the relaying strategy without AM, the UE relays with successful decoding send ACK to S and then S schedules the serving node by comparing among the modulation levels of i) only newly active UE relays or ii) newly active UE relays and the current serving node (S or UE relay).

Note that the iterative relay scheduling procedure is repeated until D sends ACK to S.

Early Termination

When end user succeeds in decoding, end user informs it to S (UE relays can overhear it) and then S or scheduled UE relay (participated in the retransmission) terminates transmission or retransmission, respectively. Note that scheduled UE relay terminates retransmission after receiving termination command from S or after overhearing ACK from D to S. As a result, the early termination can be made available at D.

Detailed Mode of Operation

Figure 9:
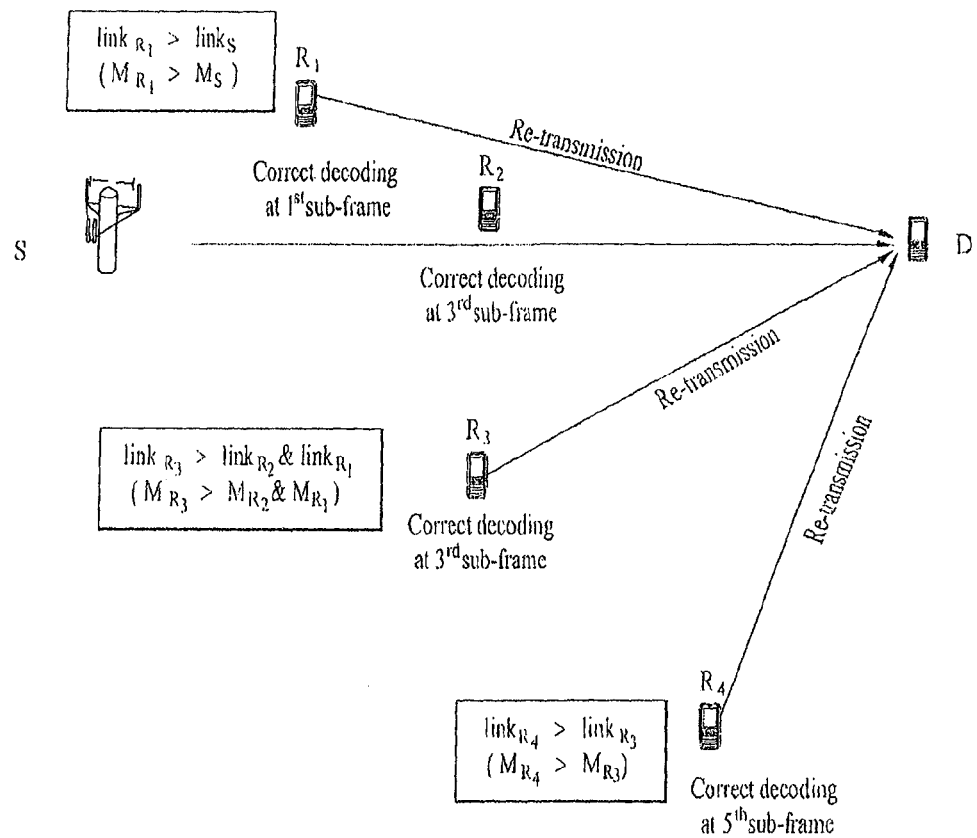
FIG. 9 is a diagram illustrating an operation of I-HARQ according to an embodiment of the present invention.
Figure 9:
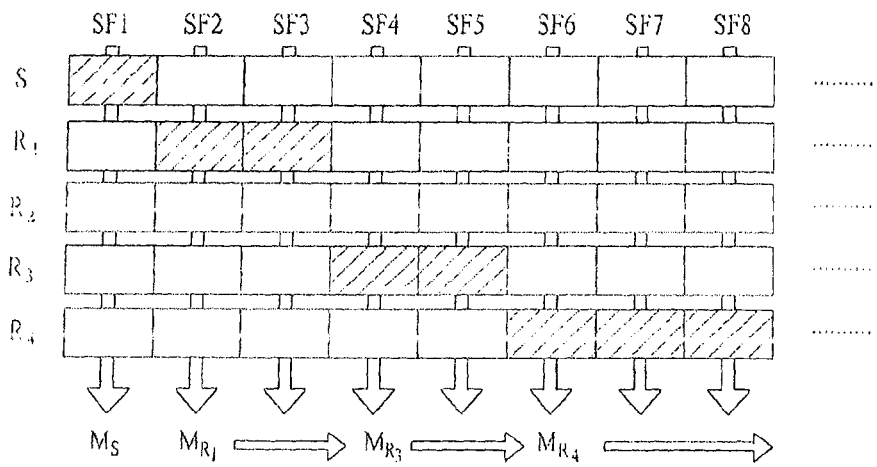

The proposed I-HARQ protocol performs open-loop and transparent retransmission mode over multiple R-D links, where partial CSIs only are available, as follows:

FIG. 9 is a diagram illustrating an operation of I-HARQ according to an embodiment of the present invention. Especially, FIG. 9 illustrates an example of how to operate the I-HARQ and how to perform information gathering at end user.

Referring to FIG. 9, prior to retransmission, Rs start overhearing the reference signal (e.g., ACK/NACK) from D to S and then estimate the partial CSI of their individual R-D links. For the basic overhearing mode, each R sends the estimated individual partial CSI to S. For the overhearing mode with AM, Rs determine their proper modulation sizes according to the estimated CSI, and then inform S of these determined modulation sizes. Note that the determination of this proper modulation size can be determined at S after S receives the estimated partial CSI from each R. The system can adopt either way considering the complexity for determination of modulation sizes at R and the limitation of data transfer amount through feedback path from R to S.

In non-adaptive retransmission mode, a scheduled R simply uses a pre-determined and fixed modulation size for retransmission, whereas in adaptive retransmission mode, S and scheduled Rs adjust their adaptive rate based on the channel status.

1) More specifically, the source (S or eNB) employs a pre-determined sequence of distinct rateless codes to encode the message comprising K information bits with CRC bits. Here, we assume that S shares this information (which code will be used for encoding in each subframe) with multiple UE relays and end user (or destination).

2) First, S transmits the encoded message to end user while UE relays overhear it until they succeed in decoding.

3) UE relays overhear the response signal (e.g., NACK) from D to S, and UE relays estimate/feedback their channel status of R-D links (via partial CSI or modulation level) to S. Here, UE relay does not transmit during the listening phase, i.e., unless it succeeds in decoding.

4) If UE relays decode the overheard message correctly after receiving a number of subframes, UE relays send ACK to S immediately. Note that UE relays can re-encode the decoded message using a pre-determined sequence of rateless codes (e.g., according to the in-phase code mapping).

5) Upon receiving ACK(s), S starts to schedule a UE relay for retransmission, as the one having the relatively highest R-D link gain (predicted by the partial CSI) among a set of candidate UE relays, and the listening phase ends.

6) The scheduled UE relay forwards the re-encoded message on the common subchannel used by S, starting from the next subframe immediately after correct decoding. Inactive UE relays keep gaining information for decoding.

7) S schedules the next UE relay iteratively on subframe basis while each scheduled UE relay forwarding the overheard message successively in each subframe until D sends ACK to S. The relay selection procedure is performed iteratively in each subframe until D sends ACK to S. This iterative scheduling on subframe basis will likely accelerate the collaboration phase.

8) When D succeeds in decoding, D informs it to S (UE relays can overhear it), and then S or a scheduled UE relay (participated in the retransmission) terminates transmission or retransmission. As a result, the early termination can be initiated by end user.

Note that D performs "information combining" for the forwarded message from the candidate UE relays being scheduled iteratively on subframe basis. Although the forwarding times at UE relays are unknown, D can search for any forwarded message from a scheduled UE relay because each message is carried on the common subchannel used by S. Hence, D does not need to know whether a specific UE relay is participating in retransmission, thereby guaranteeing open-loop and transparent retransmission to end user (D). The length of a subframe is assumed sufficiently large enough to accumulate information for decoding within one subframe time.

The main advantages of using the I-HARQ scheme for Multiple User Equipment (UE) Relays under open-loop and transparent mode can be summarized as follows:

A) The proposed I-HARQ is quite suitable for use in multiple UE relays under open-loop and transparent retransmission mode (e.g. type-2 UE relays). for data transmission, a single subchannel allocation is required for per-subframe blind search on the common subchannel for transparency and for system control, the I-HARQ is operated such that the entire control message including relaying and terminating transmission is controlled by the source, thereby UE relays have been realized with no reference signal.

B) As a strong benefit, the data rate can be increased by iteratively scheduling the UE relays closer by end user in each subframe, while exploiting partial CSI based on the overhearing mechanism of ACK/NACK for HARQ, leading to fast jump-in/successive relaying and subframe decoding.

C) Due to the increased data rate, faster jump-in forwarding at the scheduled UE relay can be made available. As a result, the earlier termination can be initiated at end user, and the redundant subframes can be reduced effectively.

D) The mechanism of overhearing (ACK/NACK) from end user at UE relays can further improve the spectral efficiency.

E) Eventually the I-HARQ enables UE-to-UE direct communication with proximity, resulting in energy saving.

F) With buffer being cleared at non-scheduled relays, UE relays can further reduce the unnecessary energy consumption.

G) As additional benefit, earlier termination and adaptive modulation can be integrated with the I-HARQ to facilitate successful decoding when end user does not gain enough subframes for decoding.

Figure 10:
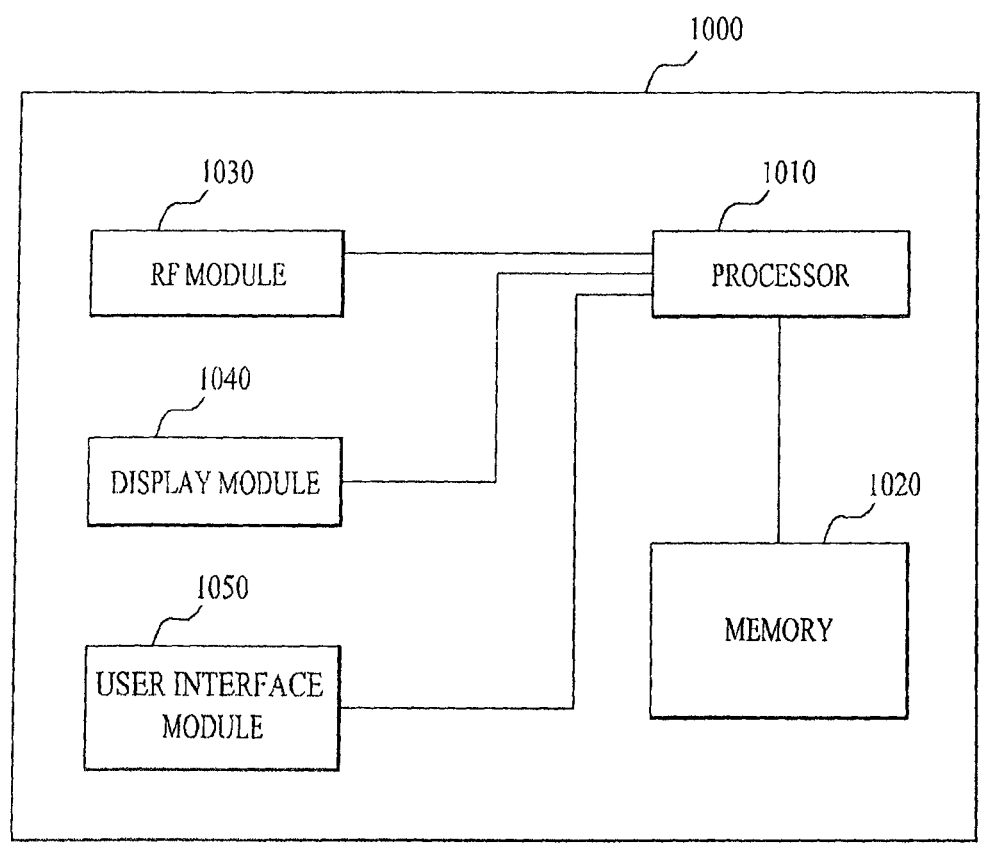
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with respect to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency up-conversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example of applying a method for transmitting downlink signal at a relay node with a base station in a wireless communication system and an apparatus therefor to a 3GPP LTE system is described, the present invention is applicable to various wireless communication systems in addition to the 3GPP LTE system.

The invention claimed is:

1. A method for transmitting a downlink signal at a source base station in a wireless communication system, the method comprising:

transmitting the downlink signal directly to an end user, wherein at least one relay overhears the downlink signal;
   receiving a negative response signal from the end user directly;
   receiving, from at least one relay, a positive response signal and channel status information about a channel between the at least one relay and the end user,
   wherein the at least one relay overhears the negative response signal and decodes the overheard downlink signal correctly; and
   scheduling a specific relay having a best channel status of the at least one relay to retransmit the downlink signal to the end user.

2. The method according to claim 1, wherein the at least one relay estimates the channel status information about the channel between the at least one relay and the end user when the at least one relay overhears the negative response signal.

3. The method according to claim 1, wherein the scheduling of the specific relay is performed iteratively until the positive response signal is received from the end user.

4. The method according to claim 1, wherein, if the end user decodes the retransmitted downlink signal correctly, the end user transmits the positive response signal to both the source base station and the specific relay.

5. The method according to claim 1, wherein, if the end user decodes the retransmitted downlink signal correctly, the end user transmits the positive response signal to the source base station.

6. The method according to claim 1, wherein the scheduling of the specific relay is performed iteratively on a subframe basis.

7. The method according to claim 1, wherein the at least one relay is a user equipment (UE) relay.

8. A method for transmitting downlink signals at a relay in a wireless communication system, the method comprising:

overhearing a downlink signal which is transmitted directly from a source base station to an end user;
   overhearing a negative response signal which is transmitted directly from the end user to the source base station;
   transmitting a positive response signal and channel status information about a channel between the relay and the end user, if the overheard downlink signal is decoded correctly;
   receiving scheduling information from the source base station; and
   retransmitting the downlink signal to the end user based on the scheduling information.

9. The method according to claim 8, wherein the relay has a best channel status among at least one relay including the relay.

10. The method according to claim 8, wherein the channel status information about the channel between the relay and the end user is estimated when the negative response signal is overheard.

11. The method according to claim 8, wherein the relay is a user equipment (UE) relay.

* * * * *